US012737211B2

(12) United States Patent
Bobde et al.

(10) Patent No.: US 12,737,211 B2
(45) Date of Patent: Sep. 15, 2026

(54) SECURELY COMMUNICATING BETWEEN ON-PREMISES SERVICES AND CLIENTS IN AN EXTERNAL NETWORK

(71) Applicant: VMware LLC, Palo Alto, CA (US)

(72) Inventors: Anant Bobde, Pune (IN); Ashwin Manekar, San Ramon, CA (US); Ankur Gupta, Pune (IN); Anima Jain, Pune (IN)

(73) Assignee: VMware LLC, Palo Alto, CA (US)

( * ) Notice: Subject to any disclaimer, the term of this patent is extended or adjusted under 35 U.S.C. 154(b) by 573 days.

(21) Appl. No.: 18/211,540

(22) Filed: Jun. 19, 2023

(65) Prior Publication Data

US 2024/0020148 A1 Jan. 18, 2024

(30) Foreign Application Priority Data

Jul. 13, 2022 (IN) ............................ 202241040211

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595; G06F 2009/45587; H04L 63/0281
See application file for complete search history.

(56) References Cited

U.S. PATENT DOCUMENTS

| | | | | |
|---|---|---|---|---|
| 9,690,925 | B1 * | 6/2017 | Banerjee | G06F 21/44 |
| 12,413,624 | B2 * | 9/2025 | Ben-Noon | H04L 63/20 |
| 2003/0065711 | A1 * | 4/2003 | Acharya | H04L 69/16<br>709/203 |

(Continued)

*Primary Examiner* — Dong U Kim
(74) *Attorney, Agent, or Firm* — Kim & Stewart LLP

(57) ABSTRACT

Some embodiments provide a method for establishing secure connections between several services operating in an on-premises network and external devices operating in an external network. The method configures each service to communicate with a reverse proxy operating in the on-premises network. The reverse proxy establishes a secure connection with each service. The method programs the reverse proxy to communicate with a forward proxy that establishes communications with the external devices. In some embodiments, the forward proxy is part of the on-premises network, while in other embodiments the forward proxy is a cloud-based service. Through the reverse and forward proxies, the on-premises services communicate with the external devices securely. For instance, in some embodiments, the forward proxy hides internal network addresses (e.g., IP addresses) and domain names of on-premises services and allows administrators to configure network monitoring to monitor and block malicious activities. The reverse proxy, in these embodiments, simplifies the connection between the on-premises services and their respective forward proxy by taking over the task of establishing communication with a myriad of potentially different forward proxies that can be used in different deployments. All the on-premises services have to do is to communicate with the reverse proxy.

20 Claims, 5 Drawing Sheets

| Service Name | IP | Port Number |
|---|---|---|
| Service 1 | 10.100.251.184 | 8090 |
| Service 2 | 10.100.251.184 | 8091 |
| Service 2 | 10.100.251.184 | 8092 |

(56) References Cited

U.S. PATENT DOCUMENTS

| | | | | |
|---|---|---|---|---|
| 2005/0097221 A1* | 5/2005 | James | H04L 67/563 709/239 |
| 2016/0088023 A1* | 3/2016 | Handa | G06F 16/972 709/219 |
| 2018/0131685 A1* | 5/2018 | Sridhar | H04L 9/3226 |
| 2018/0159882 A1* | 6/2018 | Brill | H04L 63/1425 |
| 2019/0025903 A1* | 1/2019 | Mehta | H04L 67/10 |
| 2019/0163510 A1* | 5/2019 | Govardhan | H04L 67/14 |
| 2022/0303283 A1* | 9/2022 | Mansfield | G06F 21/62 |

* cited by examiner

| **Service Name** | **IP** | **Port Number** |
| --- | --- | --- |
| Service 1 | 10.100.251.184 | 8090 |
| Service 2 | 10.100.251.184 | 8091 |
| Service 2 | 10.100.251.184 | 8092 |

SECURELY COMMUNICATING BETWEEN ON-PREMISES SERVICES AND CLIENTS IN AN EXTERNAL NETWORK

BACKGROUND

Enterprise applications, databases, or workloads running in an on-premises infrastructure often need to have communication with other devices and machines over the Internet. With direct Internet connection, the internal IP addresses and domain names get exposed to the outer world. This also reduces security control over ingress and egress Internet traffic, which leads to threats like privacy data breaches.

FIG. 1 presents an on-premises cloud native system 100 with three services 102-104 executing on a single virtual machine (VM). These services 102-104 can be accessed by clients residing in the cloud 101 through one IP address and three different ports, which are identified in FIG. 2. Each service 102-104 connects to the cloud 101 through its own individual connections 105-107. These connections 105-107 are direct communication connections since there is no proxy implemented in between the connections.

Since the services 102-104 are not connected to a forward proxy server, when a client machine in the cloud 101 is compromised with a malware, it could leverage information exchanged by any of these services 102-104 and lead to a breach of security of the on-premises services. For instance, a service might exchange data messages with a cloud client that includes personal identification information (PII) (e.g., social security number or credit card details). When the client machine is infected with a Trojan (which is a type of malware used by criminals to gain privileged access on an application server to steal sensitive information), the service can be infected with the Trojan malware, which can then access the sensitive information from the application.

Because of the security vulnerability of the on-premises cloud native system 100, forward proxy servers are used in order to allow the on-premises enterprise application to establish an Internet connection with privacy, security, and monitoring of the Internet traffic. As shown in FIG. 3, a forward proxy 308 is positioned between on-premises services 102-104 and client machines in the cloud 101. This forward proxy 308 hides internal IP addresses and domain names of on-premises services and provides network monitoring capabilities. These features help maintain privacy and security of the services 102-104.

However, to leverage all capabilities of forward proxy 308, the service applications 102-104 must be configured to connect to forward proxy server. Moreover, each service 102-104 must be able to communicate with the forward proxy 308, and this is not a trivial requirement as different premises can use a myriad of different forward proxies.

BRIEF SUMMARY

Some embodiments provide a method for establishing secure connections between several services operating in an on-premises network and external devices operating in an external network. The method configures each service to communicate with a reverse proxy operating in the on-premises network. The reverse proxy establishes a secure connection with each service. The method programs the reverse proxy to communicate with a forward proxy that establishes communications with the external devices. In some embodiments, the forward proxy is part of the on-premises network, while in other embodiments the forward proxy is a cloud-based service.

Through the reverse and forward proxies, the on-premises services communicate with the external devices securely. For instance, in some embodiments, the forward proxy hides internal network addresses (e.g., IP addresses) and domain names of on-premises services, and allows administrators to configure network monitoring to monitor and block malicious activities. The reverse proxy, in these embodiments, simplifies the connection between the on-premises services and their respective forward proxy by taking over the task of establishing communication with a myriad of potentially different forward proxies that can be used in different deployments. All the on-premises services have to do is to communicate with the reverse proxy.

The method of some embodiments configures the reverse proxy with a set of parameters that allow the reverse proxy to operate with the forward proxy. In some of these embodiments, the method loads a plugin module on the reverse proxy. Configuring the reverse proxy in some of these embodiments entails configuring the plugin module with at least a subset of the parameters to allow the reverse proxy to operate with the forward proxy.

In some embodiments, the reverse proxy is a cluster of one or more reverse proxy servers, while the forward proxy is a cluster of one or more forward proxy servers. In other embodiments, the reverse or forward proxies are standalone appliances. Also, in some embodiments, the on-premises services include several service machines executing on host computers of the on-premises network, and/or several service appliances operating in the on-premises network. The on-premises network is an on-premises cloud native system that offers several services to cloud native applications executing in a public or private cloud. In some embodiments, the external devices include machines executing in one or more private or public clouds.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for establishing secure connections between several services operating in an on-premises network and external devices operating in an external network. The method configures each service to communicate with a reverse proxy operating in the on-premises network. The reverse proxy establishes a secure connection with each service. The method programs the reverse proxy to communicate with a forward proxy that establishes communications with the external devices. In some embodiments, the forward proxy is part of the on-premises network, while in other embodiments the forward proxy is a cloud-based service.

Through the reverse and forward proxies, the on-premises services communicate with the external devices securely. For instance, in some embodiments, the forward proxy hides internal network addresses (e.g., IP addresses) and domain names of on-premises services, and allows administrators to configure network monitoring to monitor and block malicious activities. The reverse proxy, in these embodiments, simplifies the connection between the on-premises services and their respective forward proxy by taking over the task of establishing communication with a myriad of potentially different forward proxies that can be used in different deployments. All the on-premises services have to do is to communicate with the reverse proxy.

The method of some embodiments configures the reverse proxy with a set of parameters that allow the reverse proxy to operate with the forward proxy. In some of these embodiments, the method loads a plugin module on the reverse proxy. Configuring the reverse proxy in some of these embodiments entails configuring the plugin module with at least a subset of the parameters to allow the reverse proxy to operate with the forward proxy.

Figures 1, 2:
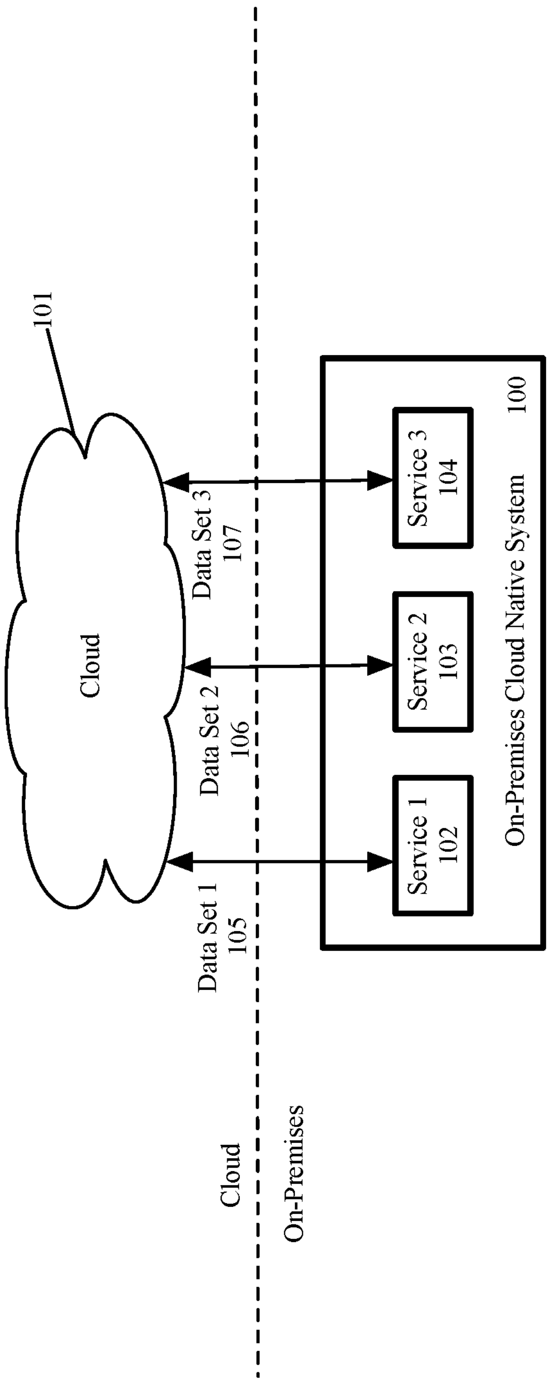
FIG. 1 conceptually illustrates an on-premises cloud native system in some embodiments with three services executing on a single virtual machine (VM).
FIG. 2 conceptually illustrates services in some embodiments that can be accessed by clients residing in the cloud through one IP address and three different ports.
Figure 3:
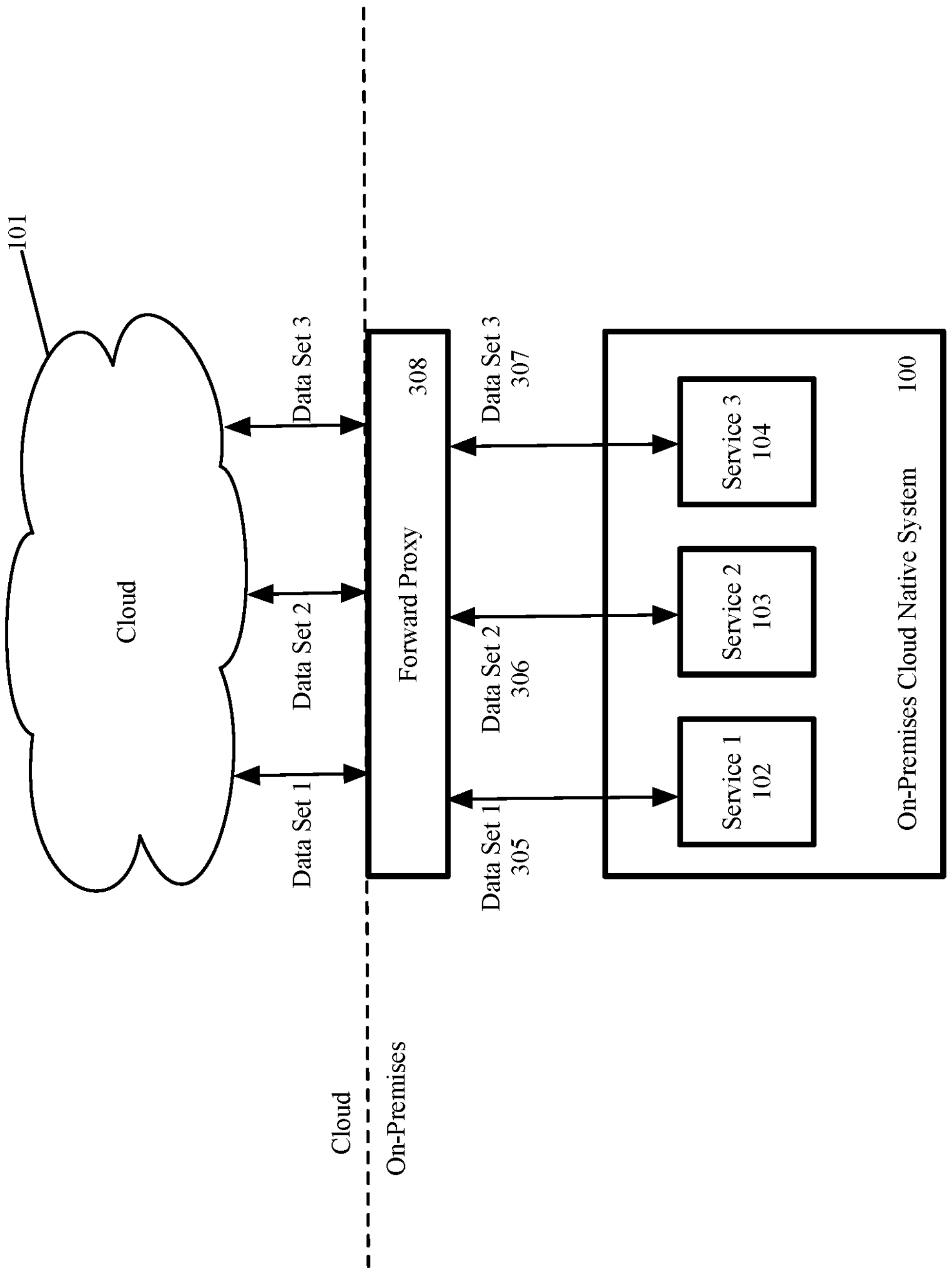
FIG. 3 conceptually illustrates a forward proxy in some embodiments positioned between on-premises services and client machines in the cloud.
Figure 4:
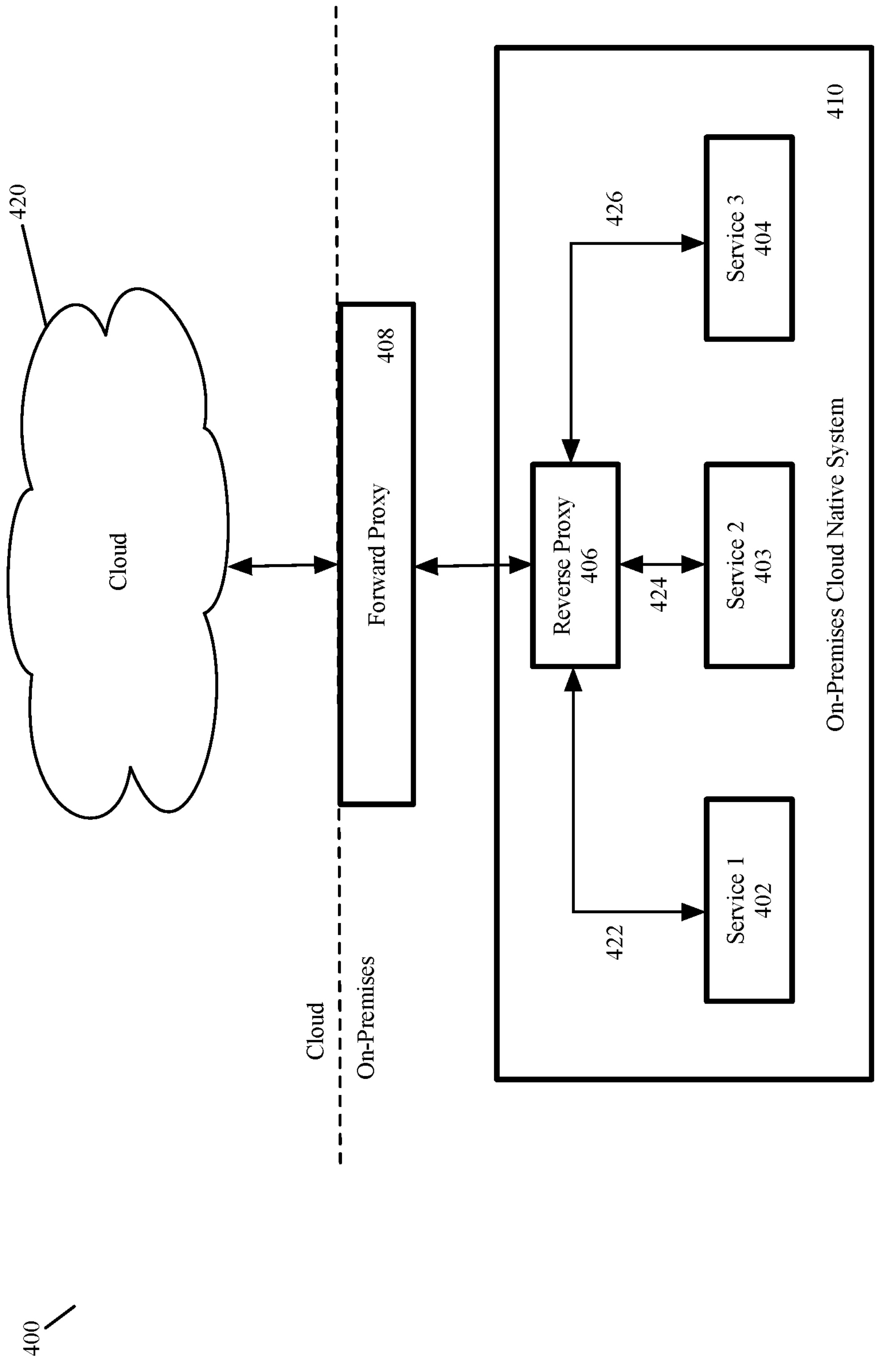
FIG. 4 conceptually illustrates an on-premises network in some embodiments that uses reverse and forward proxies to secure communications between on-premises services and machines operating in a public or private cloud.

FIG. 4 illustrates an on-premises network 400 that uses reverse and forward proxies 406 and 408 to secure communications between on-premises services and machines 402-404 operating in a public or private cloud 420. As shown, the on-premises network 400 includes multiple services 402-404, a reverse proxy 406, and a forward proxy 408. The services 402-404 and reverse proxy 406 form an on-premises cloud native system 410 that offers services to machines operating in the cloud 420. The services 402-404 are cloud native services in some embodiments. Cloud native services are services that work seamlessly with applications and infrastructures providing cloud computing providers, such as Amazon AWS®, Google Cloud™, Microsoft Azure®, etc.

Each service 402-404 is configured to establish secure connections 422-426 with the reverse proxy 406 through which it will conduct communication with the cloud machines 420 that are relayed between the reverse proxy 406 by the forward proxy 408. In some embodiments, the on-premises services include several service machines executing on host computers of the on-premises network, and/or several service appliances operating in the on-premises network. The on-premises network is an on-premises cloud native system that offers several services to cloud native applications executing in a public or private cloud. In some embodiments, the external devices include machines executing in one or more private or public clouds. Examples of on-premises services 402-404 include infrastructure services (e.g., firewall services, intrusion detection services, intrusion prevention services), and application services (e.g., financial services, such as credit card processing, loan approval, etc.).

The reverse proxy 406 establishes a secure connection 422-426 with each service 402-404, and is configured to communicate with the forward proxy 408 through a variety of protocols that can be used by a variety of different forward proxies. Examples of these protocols include HTTP, HTTPS, SOCKS, and FTP. In some embodiments, the reverse proxy is a cluster of one or more reverse proxy servers that execute on host computers operating in the on-premises network, while in other embodiments the reverse proxy is a cluster of one or more standalone appliances.

In some embodiments, the reverse proxy 406 acts like an end point of the cloud machine. It operates by (1) receiving, through the forward proxy 408, a connection request for a service 402-404 originated from the cloud machine, (2) completing a handshake with the cloud machine, and (3) terminating the initial connection. Further, the reverse proxy 406 initiates a separate connection to an actual destination service 402-404, receives a response from the service, and sends the response back to the cloud machine. Thus, the reverse proxy 406 acts as a gateway between the cloud and on-premises services. In this manner, the reverse proxy 406 is viewed as an API gateway for processing API requests from cloud machines to on-premises services.

The above-described communication between the reverse proxy and the cloud machines is through the forward proxy 408. The forward proxy 408 in some embodiments establishes secure communications with the external devices. In some embodiments, the forward proxy is part of the on-premises network, while in other embodiments the forward proxy is a cloud-based service. The forward proxy hides internal network addresses (e.g., IP addresses) and domain names of on-premises services 402-404, which thereby help maintain privacy and security of these services.

Additionally, the forward proxy 408 has network monitoring capabilities, which can be used to monitor and block malicious activities from entering the on-premises network and thereby secures the on-premises network from attacks. For the monitoring, the network administrators can set up monitoring alerts for incoming responses. These alerts can sense an invasion of an incoming trojan from the Cloud and notify the administrator, e.g., through emails, text messages or etc. Network administrators can also set up dynamic firewall rules to block traffic temporarily to/from the services and immediately report the incident to a workload management/support team. The forward proxy can also completely halt traffic to/from an infected service.

Through the reverse and forward proxies, the on-premises services communicate with the external devices securely. For instance, in some embodiments, the forward proxy hides internal network addresses (e.g., IP addresses) and domain names of on-premises services, and allows administrators to configure network monitoring to monitor and block malicious activities. The reverse proxy, in these embodiments, simplifies the connection between the on-premises services and their respective forward proxy by taking over the task of establishing communication with a myriad of potentially different forward proxies that can be used in different deployments. In the system 400, all the on-premises services 402-404 have to do is to communicate with the reverse proxy 406. This approach eliminates the need to program each service 402-404 to be able to talk to a myriad of different forward proxies that are used in a myriad of different deployments.

Different embodiments use different commercially available reverse proxies such as those offered by Envoy®, NgNIX®, and Zuul®. These reverse proxy servers provide a communication wrapper underneath services while simultaneously being able to connect to a variety of different forward proxies. With these reverse proxies, the programming burden to program individual services to talk to the forward proxy server is taken off and now the engineer can program only a reverse proxy, as described above. Also, with a reverse proxy in place, developers are free to design and create services with multiple technology stacks.

Some reverse proxies, like Envoy®, NgNIX®, or Apache®, can only be programmed to connect to HTTP or HTTPS type of forward proxy server, and do not offer connectivity with other type of forward proxy servers like SOCKS, FTP, and SMTP. Accordingly, some embodiments use the Zuul® reverse proxy, which supports not only HTTP or HTTPS types of forward proxy servers but also other types of forward proxies using other protocols (such as SOCKS, etc.).

Figure 5:
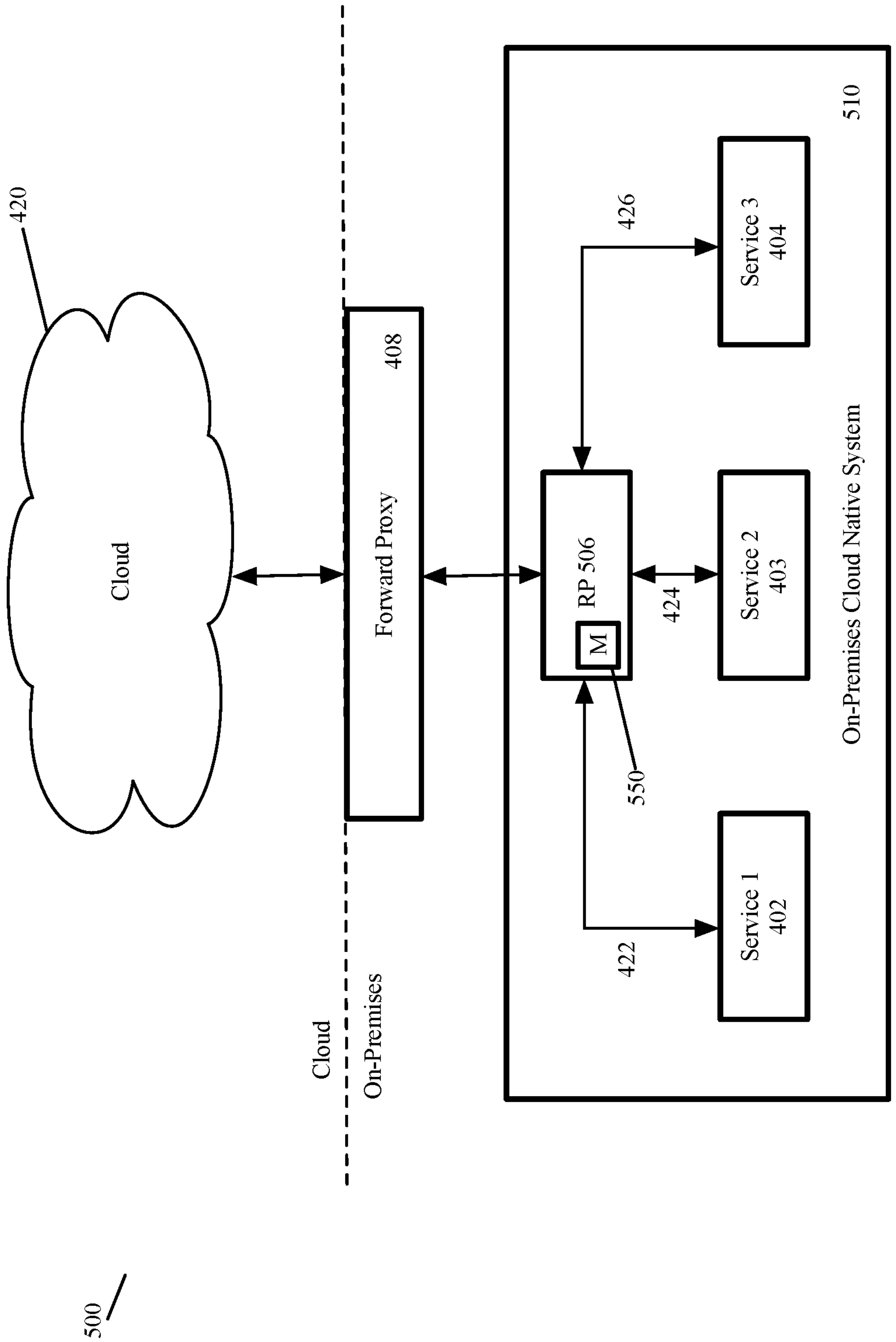
FIG. 5 conceptually illustrates an example of an on-premises network that has an on-premises cloud native system that uses a Zuul® reverse proxy in some embodiments.

FIG. 5 illustrates an example of an on-premises network 500 that has an on-premises cloud native system 510 that uses a Zuul® reverse proxy. This network 500 is similar to the network 400 except that it uses the specific Zuul® reverse proxy 506. Also, to simplify the configuration of the reverse proxy 506, some embodiments deploy one or more plugin modules 550 on the Zuul® reverse proxy, in order to reduce the overhead of programming the reverse proxy 506 to identify and communicate with the forward proxy 408 used in a particular deployment.

Specifically, through the plugin module 550 of some embodiments, a network administrator can provide a few parameters to configure the reverse proxy 506 to program itself to work with the particular forward proxy used in the particular deployment. For instance, a JSON script below illustrates an example of the few parameters that the network administrator provides to the plugin modules so that the reverse proxy can be configured to communicate with a particular forward proxy.

```
{
  “proxyType”:“HTTPS”,
  “proxyHost”:“ proxy.example.com”,
  “proxyPort”:“443”,
  “proxyUser”:“admin”,
  “proxyPassword”:“changeIt”
}
```

This information can be provided by the network administrator through a user interface, a database, or a configuration file in some embodiments.

In the example above, (1) Proxy Type defines which type of forward proxy server to connect to ex. HTTP/HTTPS/SOCKS etc., (2) proxy host provides the IP address or domain of a forward proxy server (e.g., 10.102.38.130 or a domain name, such as proxy.example.com), (3) proxy server port is the port number (e.g., 443) of a forward proxy server, (4) proxy server user, if an authenticated proxy server is used and the user's name is to be provided, and (5) proxy server password, if the authentication proxy server is used and a password is to be provided. In the example above, these parameters are HTTPS (for forward proxy server type), “proxy.example.com” for its address, “443” port for its port, with credentials “admin” and “changeIt” for the authentication.

As mentioned above, the plugin module 550 detaches the overhead from the on-premises application to the program itself and helps with connecting the on-premises application with the forward proxy server 408 seamlessly. Moreover, once programmed, the reverse proxy 506 takes the burden off the underneath services 402-404 of programming themselves to connect to forward proxy server 408. At the same time, it also allows the underneath services 402-404 to be implemented with any technology stack of choice. Most importantly, it supports more forward proxy server types like HTTP/HTTPS/SOCKS etc. than other existing reverse proxies, such as Envoy®/NgNIX®.

Through this reverse proxy 506 and the forward proxy 408, the on-premises cloud native system 500 can establish a secured, monitorable, and anonymized Internet connection between on-premises services and cloud machines. The on-premises cloud native system 400 of FIG. 4 also provides these benefits, albeit with additional programming of the reverse proxy required to configure the reverse proxy and support as many forward proxies.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term “software” is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
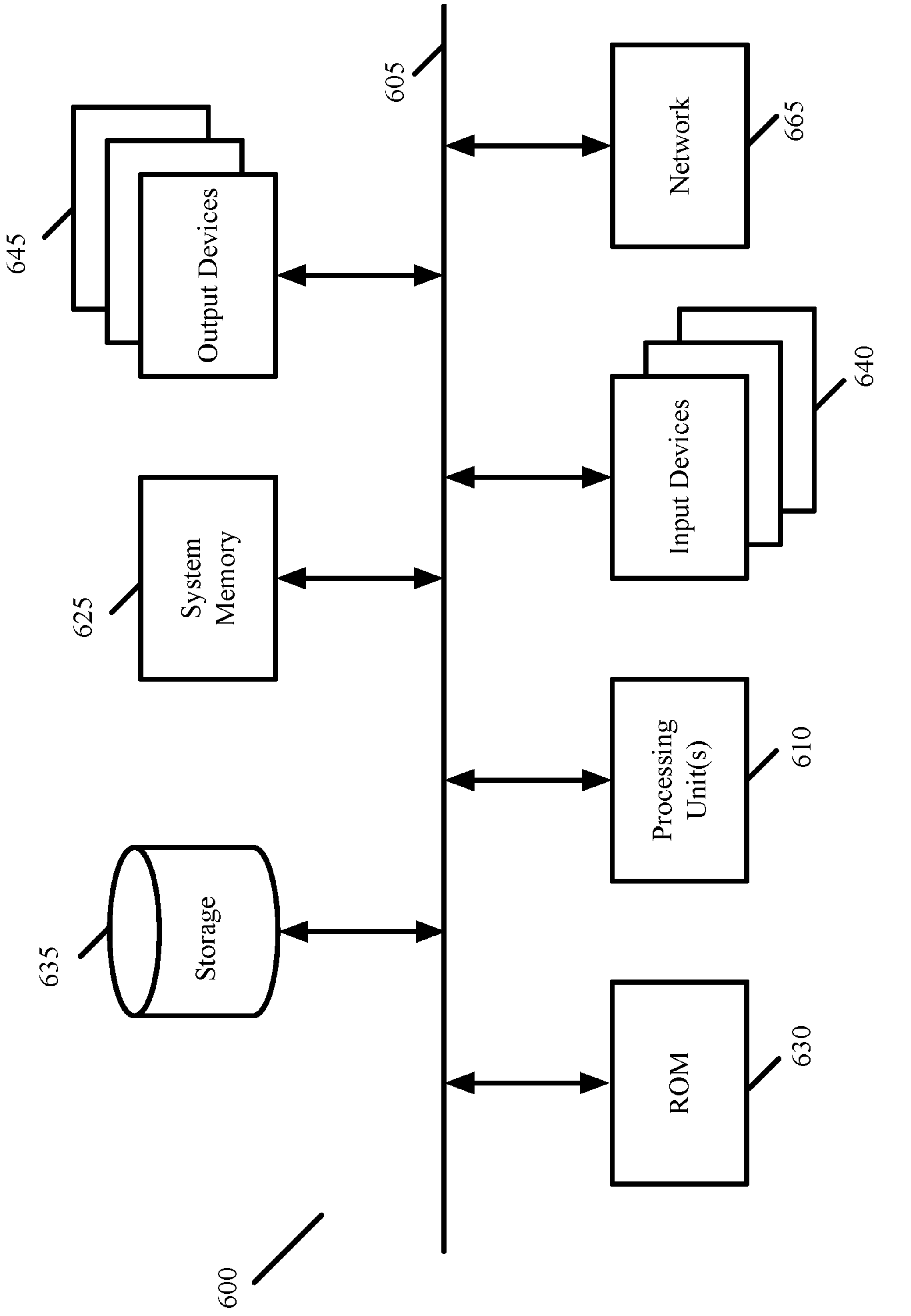
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described computers and servers. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for establishing secure connections between a plurality of services operating in an on-premises network, and external devices operating in an external network, the method comprising:

at the on-premises network:

programming each of the plurality of services to communicate with a reverse proxy operating in the on-premises network;

establishing a secure connection from each of the plurality of services to the reverse proxy; and programming the reverse proxy to directly and bidirectionally communicate with a forward proxy that establishes communications with the external devices, in order for the plurality of services to communicate with the external devices through the reverse proxy and the forward proxy, without direct communication between the plurality of services and the forward proxy.

2. The method of claim 1, wherein by using the reverse proxy, the plurality of services no longer have to establish communication with the forward proxy.

3. The method of claim 2, wherein the reverse proxy is programmed to operate with a plurality of different forward proxies that use a plurality of different communication protocols.

4. The method of claim 2, wherein the forward proxy is deployed in the on-premises network.

5. The method of claim 2 further comprising configuring the reverse proxy with a set of parameters that allow the reverse proxy to operate with the forward proxy.

6. The method of claim 5, wherein loading a plugin module on the reverse proxy, wherein configuring the reverse proxy comprises configuring the plugin module with at least a subset of the parameters to allow the reverse proxy to operate with the forward proxy.

7. The method of claim 1, wherein the reverse proxy is a cluster of one or more reverse proxy servers, and the forward proxy is a cluster of one or more forward proxy servers.

8. The method of claim 1, wherein the services comprise at least one of (i) a plurality of service machines executing on host computers of the on-premises network, and (ii) a plurality of service appliances of the on-premises network.

9. The method of claim 1, wherein the on-premises network is an on-premises cloud native system that offers the plurality of services to cloud native applications executing in a public cloud.

10. The method of claim 1, wherein the external devices comprise machines executing in one or more public clouds.

11. A system for establishing secure connections between a plurality of services operating in an on-premises network and external devices operating in an external network, the system comprising a reverse proxy operating in the on-premises network and configured to communicate along a secure connection with each of the plurality of services; and a forward proxy to establish communications with the external devices, the reverse proxy programmed to directly and bidirectionally communicate with the forward proxy in order for the plurality of services to communicate with the external devices through the reverse proxy and the forward proxy, without direct communication between the plurality of services and the forward proxy.

12. The system of claim 11, wherein by using the reverse proxy, the plurality of services no longer have to establish communication with the forward proxy.

13. The system of claim 12, wherein the reverse proxy is programmed to operate with a plurality of different forward proxies that use a plurality of different communication protocols.

14. The system of claim 12, wherein the forward proxy is deployed in the on-premises network.

15. The system of claim 12, wherein the reverse proxy is configured with a set of parameters that allow the reverse proxy to operate with the forward proxy.

16. The system of claim 15, wherein loading a plugin module on the reverse proxy, wherein the reverse proxy is configured by configuring the plugin module with at least a subset of the parameters to allow the reverse proxy to operate with the forward proxy.

17. The system of claim 11, wherein the reverse proxy is a cluster of one or more reverse proxy servers, and the forward proxy is a cluster of one or more forward proxy servers.

18. The system of claim 11, wherein the services comprise at least one of (i) a plurality of service machines executing on host computers of the on-premises network, and (ii) a plurality of service appliances of the on-premises network.

19. The system of claim 11, wherein the on-premises network is an on-premises cloud native system that offers the plurality of services to cloud native applications executing in a public cloud.

20. The system of claim 11, wherein the external devices comprise machines executing in one or more private clouds.

* * * * *